US006860182B2

(12) United States Patent
Mathias

(10) Patent No.: US 6,860,182 B2
(45) Date of Patent: Mar. 1, 2005

(54) BAND SAW SELF COOLING ROLLER GUIDE

(75) Inventor: Joseph W. Mathias, Nabb, IN (US)

(73) Assignee: Ashmore Machinery, LLC, Madison, IN (US)

(*) Notice: Subject to any disclaimer, the term of this patent is extended or adjusted under 35 U.S.C. 154(b) by 122 days.

(21) Appl. No.: 09/837,111

(22) Filed: Apr. 18, 2001

(65) Prior Publication Data

US 2002/0152863 A1 Oct. 24, 2002

(51) Int. Cl.[7] .......................... B26D 7/08; B26D 1/46; B23D 59/04; B27B 13/00

(52) U.S. Cl. .......................... 83/169; 83/170; 83/788; 83/820; 83/821

(58) Field of Search .......................... 83/170, 820, 821, 83/788, 169; 474/93; 451/449; 492/12, 46; 188/71.6, 270, 301, 233.7, 264 R, 264 A; 165/59, 90, 168, 169; D8/360

(56) References Cited

U.S. PATENT DOCUMENTS

| | | | | | |
|---|---|---|---|---|---|
| 217,393 | A | * | 7/1879 | McMillan | 474/93 |
| 337,913 | A | * | 3/1886 | Allington | 83/820 |
| 1,357,328 | A | | 11/1920 | Killander | |
| 1,385,396 | A | * | 7/1921 | Rayburn | 474/93 |
| 2,584,190 | A | * | 2/1952 | Danly et al. | 188/264 A |
| 2,601,095 | A | * | 6/1952 | Crane | 83/820 |
| 2,688,990 | A | | 9/1954 | Bushey et al. | |
| 2,821,269 | A | * | 1/1958 | Keil | 188/264 R |
| 2,842,974 | A | * | 7/1958 | Neumann | 474/93 |
| 2,850,852 | A | * | 9/1958 | Hofberger | 451/449 |
| 3,135,127 | A | | 6/1964 | Reed | |
| 3,229,424 | A | * | 1/1966 | Fairchok | 451/303 |
| 3,826,306 | A | * | 7/1974 | Marsh | 165/47 |
| 3,943,785 | A | * | 3/1976 | Percifield | 474/93 |
| 3,982,796 | A | | 9/1976 | Hill | |
| 4,027,568 | A | | 6/1977 | Cleland | |
| 4,096,906 | A | | 6/1978 | Bonnamour | |
| 4,136,590 | A | | 1/1979 | Kordyban et al. | |
| D252,750 | S | * | 8/1979 | Painter et al. | D8/360 |
| 4,290,330 | A | | 9/1981 | Washio et al. | |
| 4,323,286 | A | | 4/1982 | Vohr | |
| 4,341,138 | A | | 7/1982 | Sidler | |
| 4,883,369 | A | | 11/1989 | Jude et al. | |
| 5,795,137 | A | | 8/1998 | Ozawa et al. | |
| 5,802,939 | A | | 9/1998 | Wiand et al. | |
| 5,992,587 | A | | 11/1999 | Maldonado | |
| 6,422,358 | B2 | * | 7/2002 | Deibel | 188/264 AA |

* cited by examiner

*Primary Examiner*—Boyer D. Ashley
(74) *Attorney, Agent, or Firm*—Carrithers Law Office, PLLC; David W. Carrithers

(57) ABSTRACT

The band saw self cooling roller guide is defined by a main cylindrical roller body having a front portion of reduced diameter forming a collar for mounting coaxially around a shaft, and a flange extending from the rear portion thereof forming a shoulder. The thin rear edge of the band saw blade or ribbon abuts the flange which aids in aligning the blade, and the flat surface of the blade rests upon a plurality of grooves formed around the peripheral surface of the main roller body. A plurality of apertures such as louvered holes are formed in the face of the body and extend through the flange to funnel air their the rotating roller body cooling the roller, aligning the blade, and extending the wear thereof.

15 Claims, 8 Drawing Sheets

BAND SAW SELF COOLING ROLLER GUIDE

BACKGROUND OF THE INVENTION

1. Technical Field

This invention relates generally to band saws and more particularly to a flanged guide roller with air flow passages there though to help dissipate heat from the roller during use thereof.

2. Background of the Invention

Conventionally band saws have a pair of blade guides which are located one on each of respective opposite sides of the active cutting portion of the saw blade. One known conventional band saw guide comprises a pair of slide blocks spaced apart from one another and mounted on a backing plate. The saw band passes through the gap between the slide blocks that are closely adjacent but spaced from opposite faces of the blade and the backing plate engages the edge of the blade to counteract forces imposed on the blade during cutting. The slide blocks are located rearwardly from the teeth because of their set to cut a kerf that is wider than the blade thickness. There may also be rollers that rollingly engage opposite faces the blade and by way of example of the same reference maybe had to U.S. Pat. No. 4,290,330 granted Sep. 22, 1981 to I. Washio et al and entitled “Bandsaw Blade Guiding Apparatus”.

Another known guide comprises a pair of rollers that rollingly engage respective opposite faces of the band blade and a third roller that rollingly engages the back edge of the blade. The rollers do not generate as much heat as do the slide blocks from frictional engagement with the blade.

A still further blade guide comprises a roller that has an outwardly projecting flange on one edge thereof. The rear edge of the blade engages the flange and a face of the blade engages the outer face of the roller. The one roller guide is much simpler than some of the other arrangements but the useful life of roller is shortened by heat generated by frictional contact of the blade with the roller and particularly the sliding contact between the rear edge of the blade and the flange on the guide roller. By way of example of a flanged roller blade guide reference may be had to U.S. Pat. No. 2,688,990 granted Sep. 14, 1954 to W. Bushey et al and entitled “Band Saw Guide” The disclosed guide employs a back-up roller for each of the respective pair of guide rollers.

SUMMARY OF INVENTION

The band saw self cooling roller guide is defined by a main cylindrical roller body having a front portion of reduced diameter forming a collar for mounting coaxially around a shaft, and a flange extending from the rear portion thereof forming a shoulder. The thin rear edge of the band saw blade or ribbon abuts the flange which aids in aligning the blade, and the flat surface of the blade rests upon a plurality of grooves formed around the peripheral surface of the main roller body. A plurality of apertures such as louvered holes are formed in the face of the body and extend through the flange to funnel air through the rotating roller body cooling the roller, aligning the blade, and extending the wear of the roller and blade.

A principal object of the present invention is to provide a flange type guide roll that incorporates means to dissipate some of the heat therefrom generated therein during use.

In keeping with the forgoing there is provided a bandsaw blade roller guide comprising a body member having a front face and a rear face and mountable for rotation about an axis passing through the faces. The body member having an outer peripheral surface parallel to the axis for rollingly engaging a side flat face the band saw blade and a flange extending outwardly therefrom. The flange has a front face surface disposed perpendicular to the peripheral surface for engaging the rear edge of the bandsaw blade. The body member has a plurality of passages extending there through with inlets thereto in the rear face and outlets therefrom in the front face. The body member includes means adjacent the inlets such as apertures, to cause air to flow through the passages during rotation of the roller. Moreover, the apertures may include through bores angled forming louvers for funneling air through.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENTS

Figure 1:
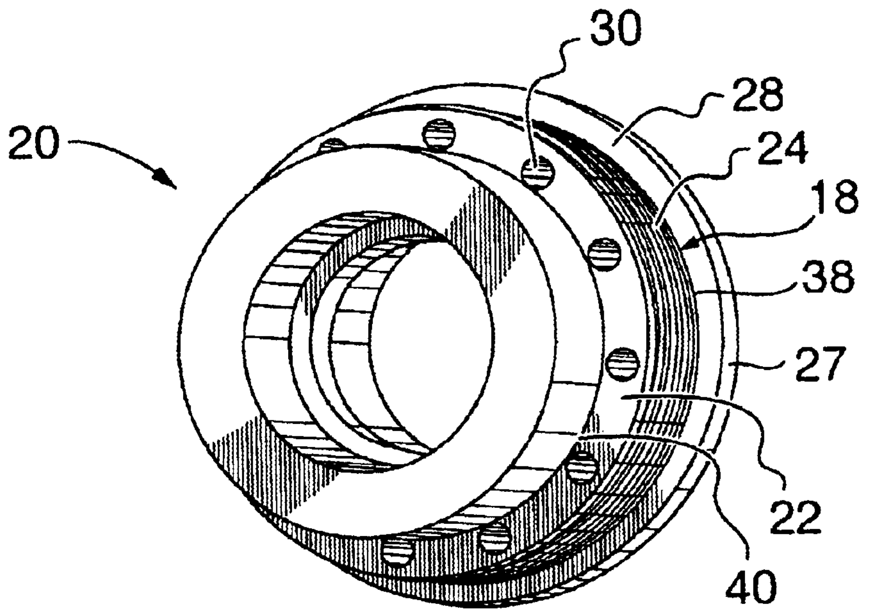
FIG. 1 is a front oblique view of the present invention showing a bandsaw roller guide of the present invention.
Figure 2:
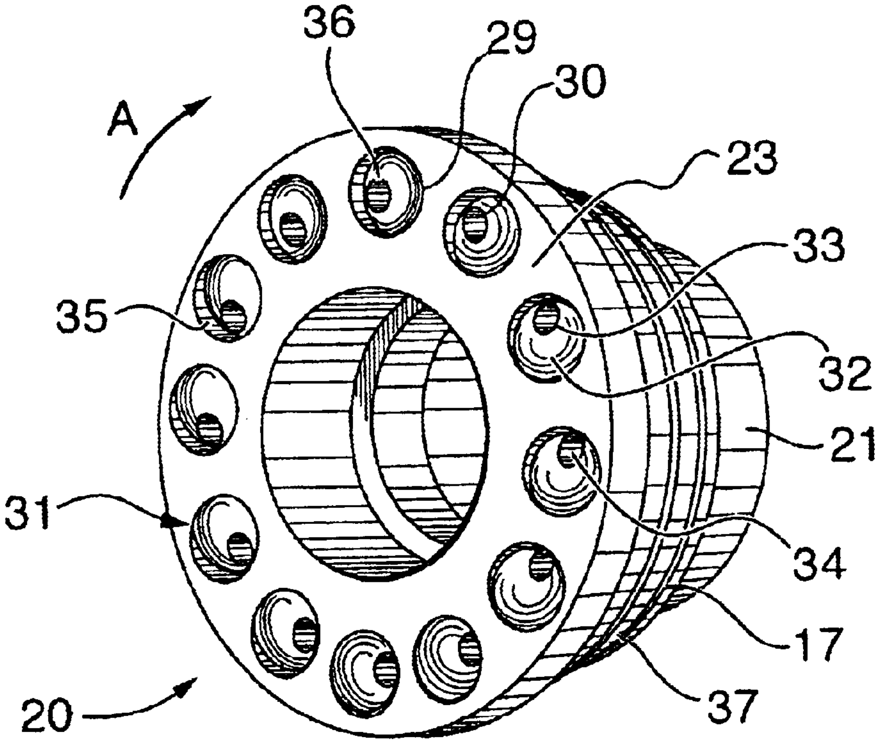
FIG. 2 is a rear oblique view of the present invention showing the roller guide shown in FIG. 1.
Figure 3:
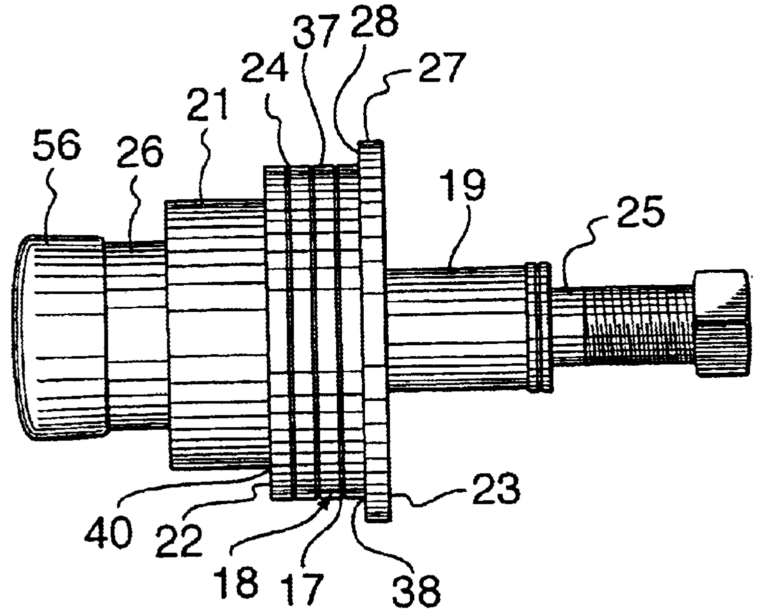
FIG. 3 is a perspective side view of the present invention showing a roller journalled on a roller mounting shaft.
Figure 4:
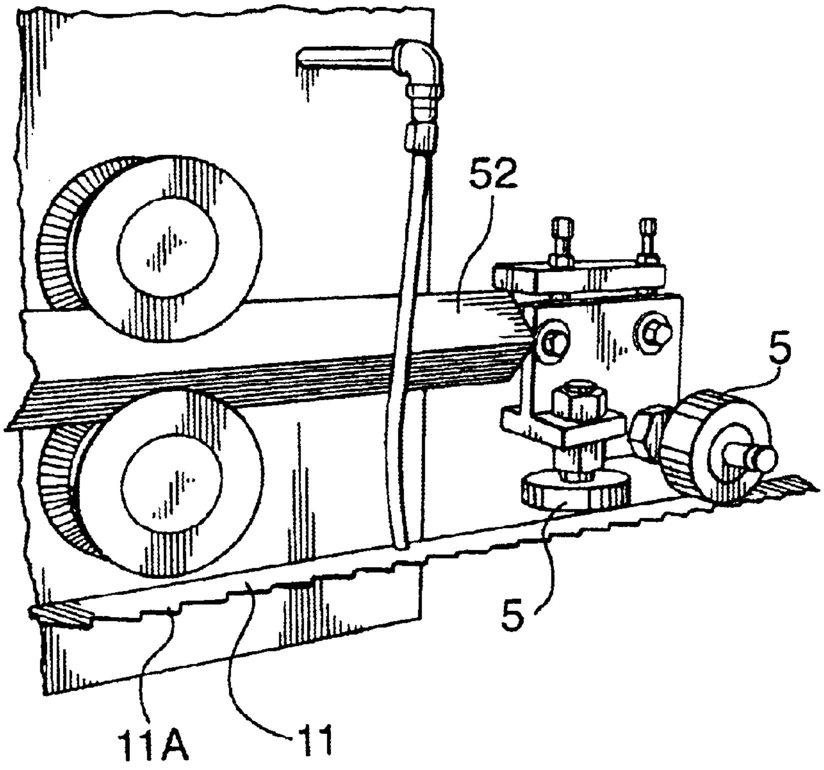
FIG. 4 (Prior Art)
FIG. 4 is a partial perspective view of a prior art embodiment of a conventional bandsaw showing a conventional vertical mounted guide roller and conventional horizontally mounted guide roller on the left hand side of that same cutting portion of the blade mounted to an arm guide.
Figure 5:
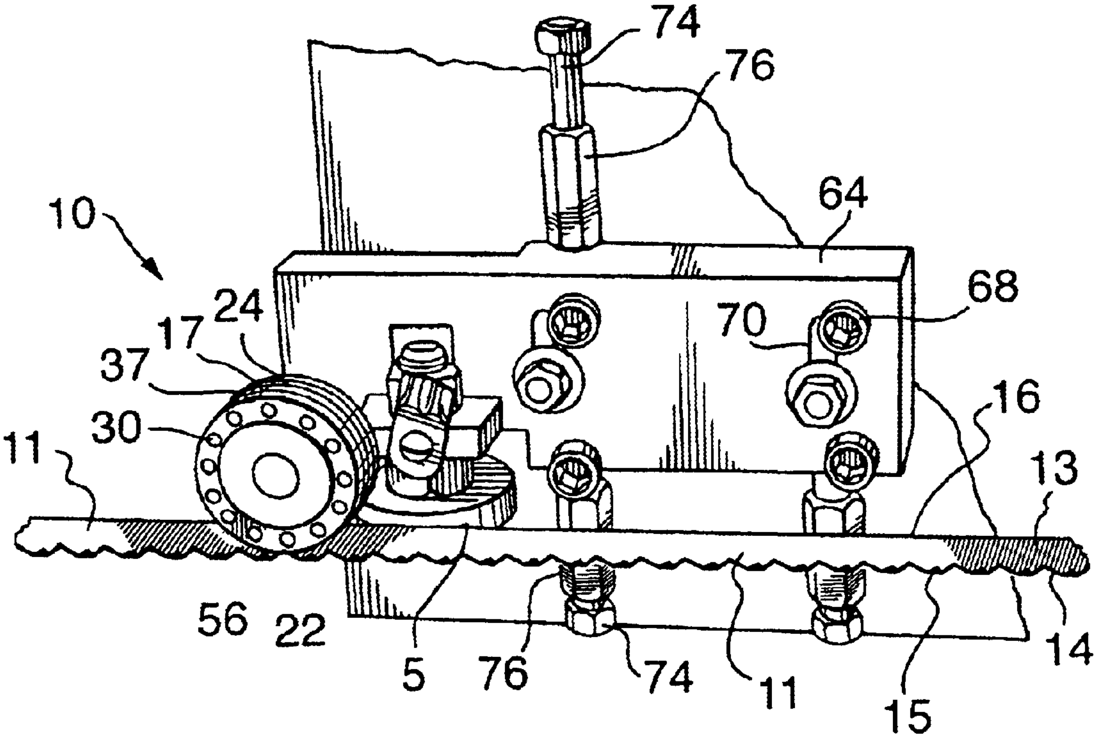
FIG. 5 is a partial perspective view of the present invention showing the use of horizontally mounted roller guide supporting a band face, wherein the roller guide has cooling apertures forming air flow through passages therein used in combination with conventional roller guide mounted vertically engaging the rear edge of the blade wherein both rollers are mounted to a roller guide back plate.

Referring to FIGS. 4 and 5 of the drawings there is diagrammatically illustrated a portion of a band saw 10 having a pair of blade guide rollers 20 spaced apart from one another longitudinally along a selected active cutting length portion 11A of the bandsaw blade 11 to guide the same and counteract forces imposed thereon during cutting. The blade 11 is an endless band with respective opposite flat side faces 13 and 14, a plurality of teeth 15 along the front cutting edge and a rear edge 16 disposed opposite said front cutting edge. The bandsaw blade 11 is supported by a pair of wheels or drums in alignment and spaced apart from with one another supported on a frame and powered by one or more electric motors. Conveyors transport the logs or beams of wood normal to and inbetween the drums at a selected height for contact with the bandsaw blade which cuts planks therefrom as the wood is pushed through the blade. Conventional guide rollers 5 consist of a wheel or disc on a bearing having a smooth pheripheral surface for contacting the band saw blade face or rear edge of the band saw blade.

A preferred embodiment of each guide roller depicting preferred embodiments of the present invention is best illustrated in FIGS. 1–3, 5, and 12–14. The guide roller 20 shown best in FIGS. 1–3 and 8, comprises a generally cylindrical body member 18 having respective front and rear faces 22 an 23 and an outer peripheral surface 24 formed having at least one circumferential groove 17, and preferably a plurality of alternating circumferential grooves 17 and ridges 37 therearound formed into the surface by cutting, grinding, molding or the like, that rollingly engages one of the flat side face 13 or 14 of the saw blade. The body member 18 is journalled for rotation on a mounting shaft or bolt 25 by means of a suitable bearing 26 (preferably including a grease seal 56) mounted on a spindle of shaft 19. A flange 27 extends outwardly from the peripheral surface 24 of the rear portion of the body 18 forming a first shoulder 38. The shoulder 38 extending normal to the body of the flange 27 forms a front face 28 for engaging the rear edge 16 of the blade 11. The distance from the face 27 to the edge of the peripheral surface 24 is less than the distance from the band rear edge 16 to the root of the cutting teeth as is conventional in the art.

In accordance with the present invention the front portion of the roller body 18 is formed having a reduced external diameter forming a cylindrical member or collar 21 and second shoulder 40 connecting normal thereto whereby the shoulder 40 forms the front face 22 of the roller body. In an alternate embodiment illustrated in FIGS. 13 and 14, the roller body 18 does not include the collar 21 and the front face extends flush with the end of the roller body 18. In another preferred embodiment illustrated in FIG. 12, the collar 21 extends upward to the face 22 of the roller body is sloped at an angle intersecting the roller body at shoulder 40.

Figure 10:
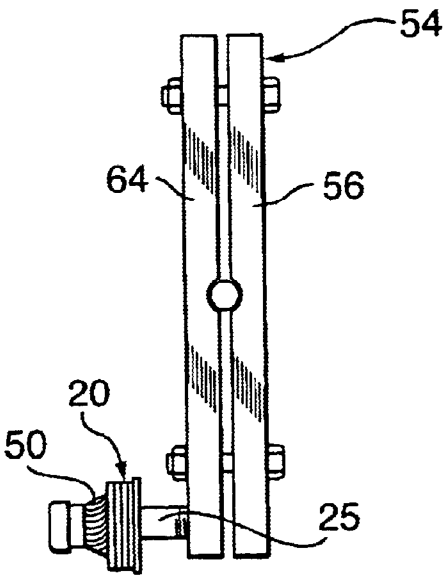
FIG. 10 is a side view of the mounting plate assembly of FIG. 9.
Figure 11:
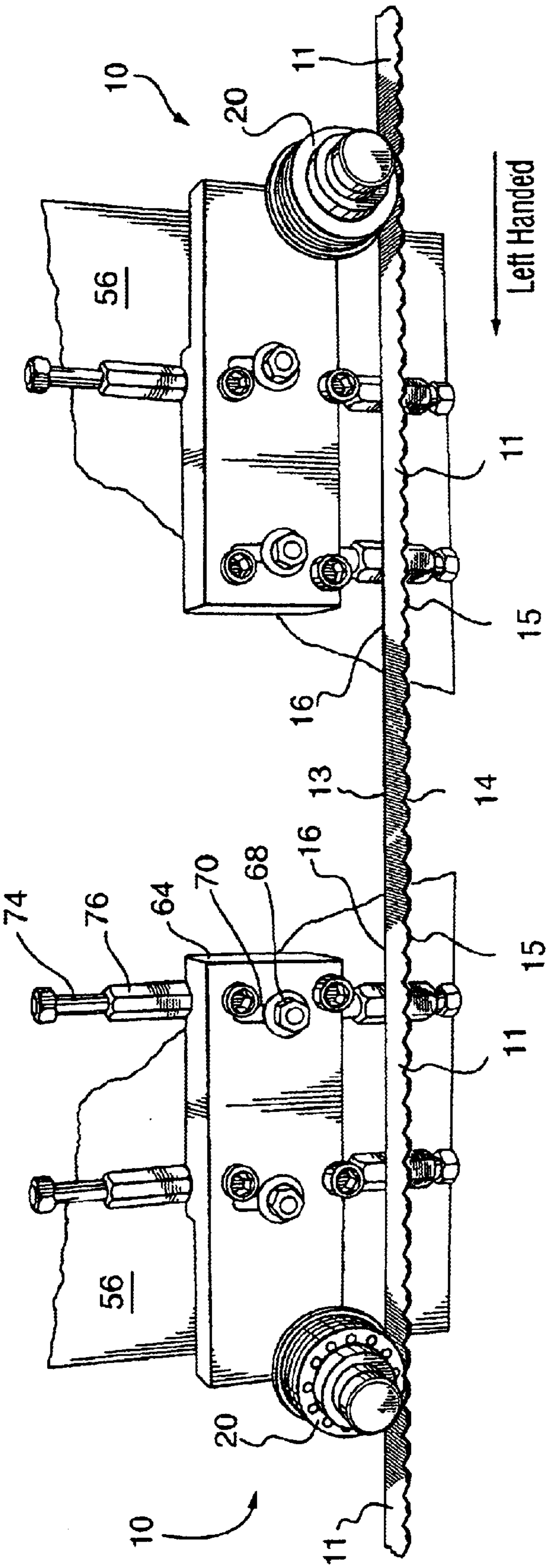
FIG. 11 is a practical perspective view of the present invention showing a left handed saw wherein the blade is rotating clockwise and the lumber to be cut would pass between the spaced apart mounting blocks, showing a guide roller with a shoulder flange and grooves around the cylindrical body on the blade receiving end and a guide roller with a shoulder flange and grooves around the cylindrical body including air flow passages formed therethrough positioned on the blade and saw dust exiting end.
Figure 12:
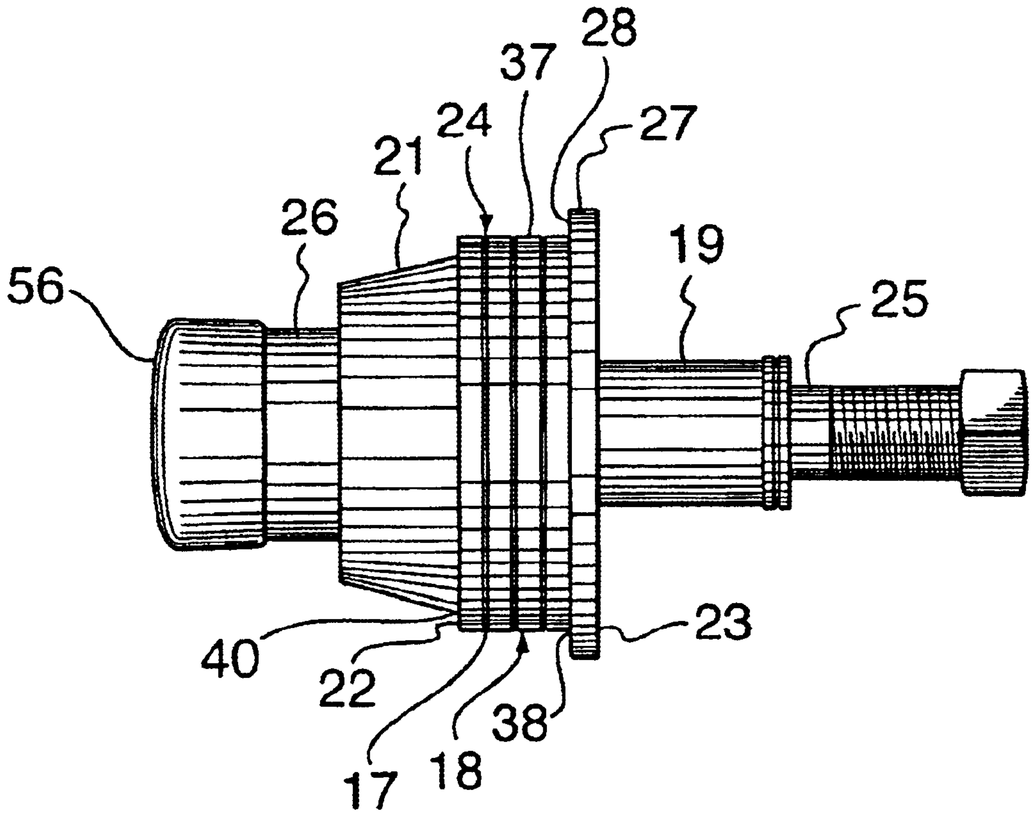
FIG. 12 is a perspective side view of an alternate embodiment of the present invention showing a roller journalled on a roller mounting shaft including a sloped collar.
Figure 13:
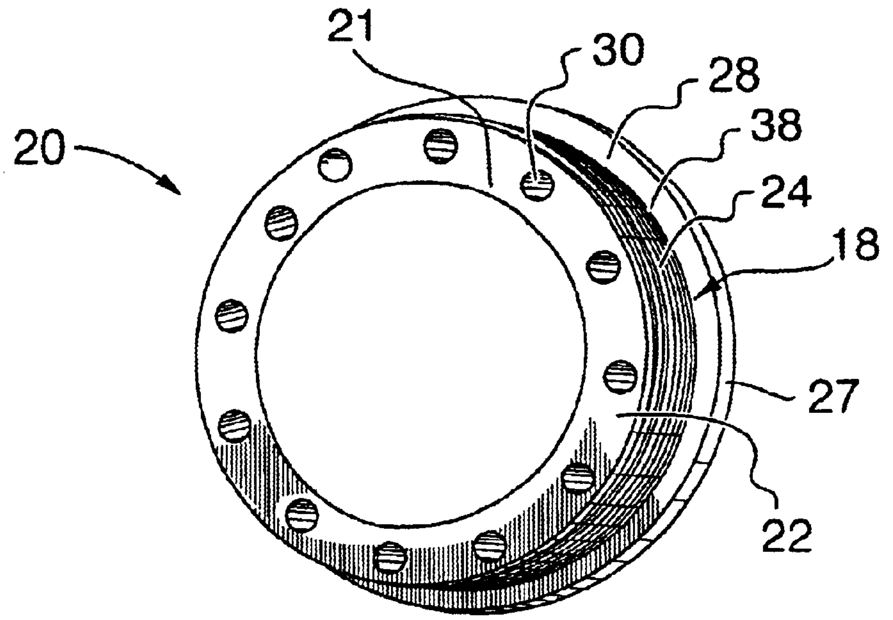
FIG. 13 is a front oblique view of an alternate embodiment of the present invention showing a bandsaw roller guide of the present invention without a collar portion.
Figure 14:
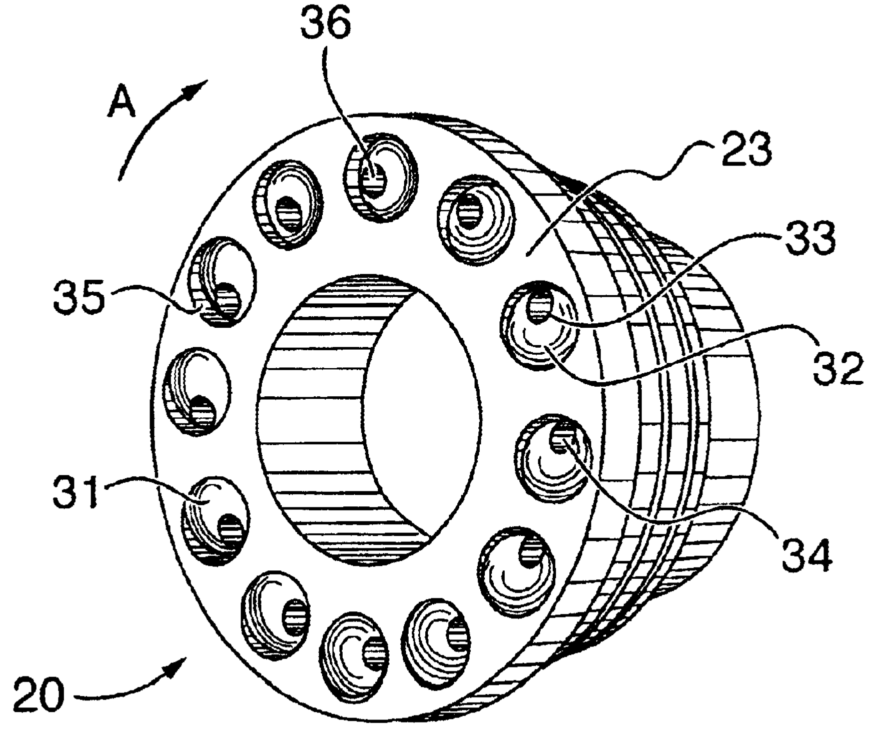
FIG. 14 is a rear oblique view of the invention of FIG. 12 showing the air passages formed therethrough.

While the guide roller 20 positioned on the exit side of the mill defining the second roller with respect to the direction of rotation of the saw blade gets extremely hot due to the hot saw dust interacting therewith carried thereto by the saw blade due to the friction associated with the blade pulling the saw dust through the lumber being cut. The heat buildup tends to cause the blade to warp and wallow when hot and cut in a wavy pattern often resulting in a reduced feed speed. In order to dissipate the heat and remedy the warping problem, a plurality of air flow passages are utilized within the exit guide roller 20. More particularly, the roller body 18 has a plurality of air flow through passages 30 extending from one to the other of the front and rear faces 22 and 23, respectively. Air is caused to flow through the passages 30 in a direction from the rear face 23 to the front face 22 by air flow causing means as the roller during operation rotates in the direction of arrow A in FIG. 2. The air flow causing means, in the illustrated embodiment, comprises an entry portion 31 in the rear fare 23 for each respective passage 30 and wherein the entry portion 31 is a concave depression. The depression may be variously formed for example by a portion of a drill hole whose axis of rotation is at a selected angle to the longitudinal axis of the passage 30 associated therewith. The concave depression has a leading portion 32 sloping gently from a leading edge 29 toward a trailing edge 33 defining the leading edge of an inlet 34 to the passage and terminating in a rear wall 35 adjacent a trailing edge 36 of the inlet 34. The rear wall 35 is approximately at right angles to the surface of the rear face 23 at its steepest central portion and merges via curved surfaces of gradually decreasing slope into the gently sloping leading portion 32. Alternatively the air flow causing means maybe appropriately shaped and appropriately positioned projections or fins 50 on the surface 23 and/or flange 26 as shown in the embodiment of FIG. 10.

The guide roller 46 positioned on the entry side of the saw blade is not exposed to hot saw dust and may be utilized having rear flange 27 for biasing the blade and a flat surface without grooves or air passages within the body; however, a preferred embodiment would still utilize grooves 17 and ridges 37 on the roller body to aid in cooling and positioning of the blade thereon.

Of course, both the entry and exit rollers may be formed having rear flanges 27, grooves 17 and ridges 37 on the roller body, and air passages therethrough; however, it is contemplated that one or more of these features can be utilized independently or together to obtain an improvement over existing wheel type roller bearings. Also, the improved guide rollers of the present invention may be used in combination together or with conventional rollers to effect an improved degree of wear over conventional rollers provided the improved rollers are utilized in the exit position of the saw blade subjected to the hot saw dust.

Figure 6:
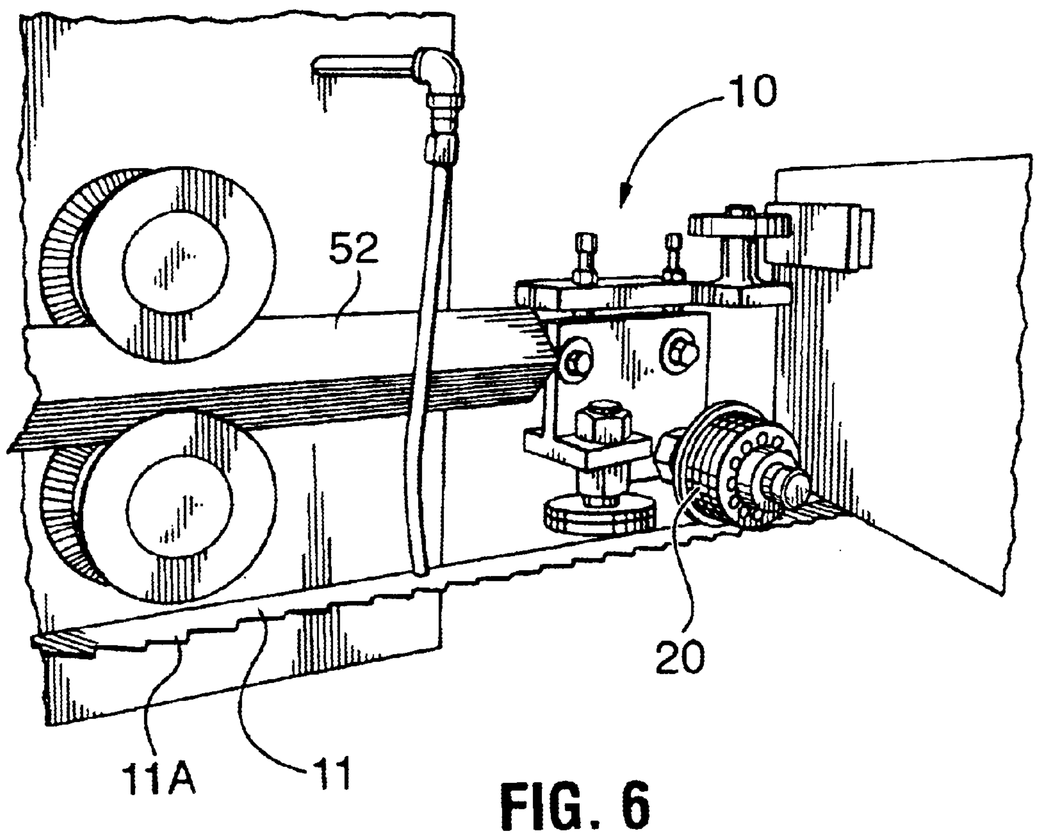
FIG. 6 is a partial perspective view of a preferred embodiment of the present invention showing a blade guide roller having a rear flange, cylindrical body member including grooves and ridges therearound, and air flow through passages formed in the face of the body, wherein the guide roller is mounted on the right hand side of the active cutting portion of the blade to a conventional arm guide.
Figure 7:
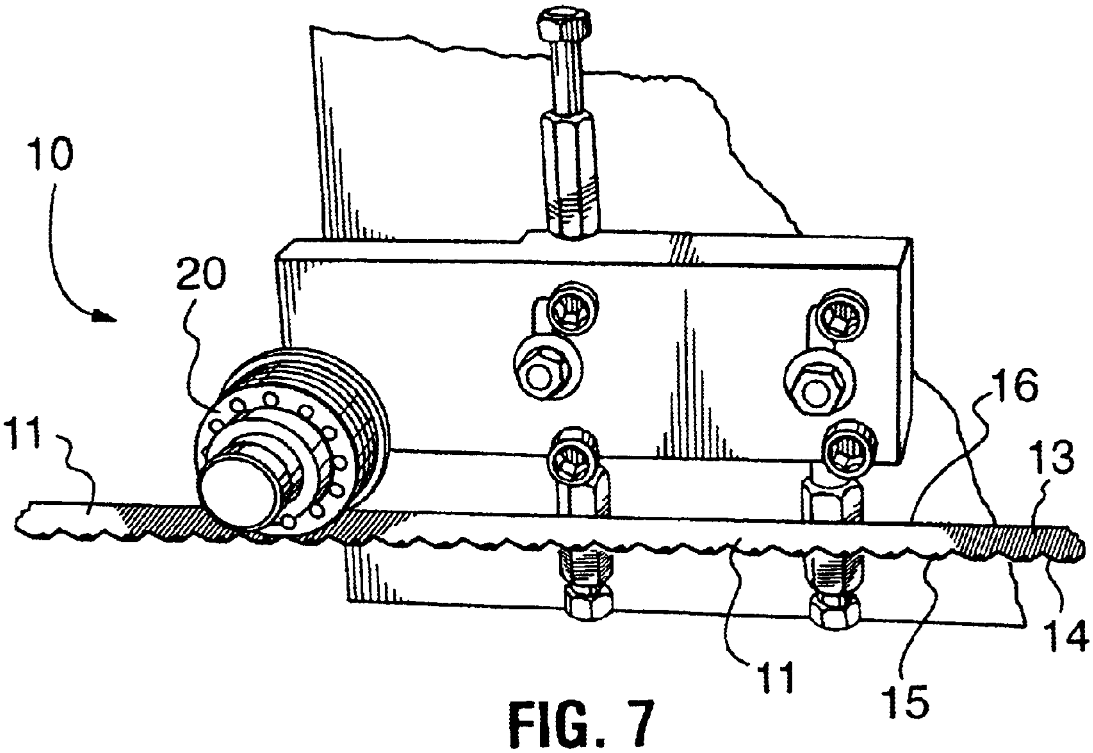
FIG. 7 is a partial perspective view of the present invention showing the use of horizontally mounted roller guide having a cylindrical body with grooves and ridges therearound supporting a band blade face and a flange forming a shoulder for supporting the end edge of the band blade, wherein the roller guide has cooling apertures forming air flow through passages therein mounted to a roller guide back plate.
Figure 8:
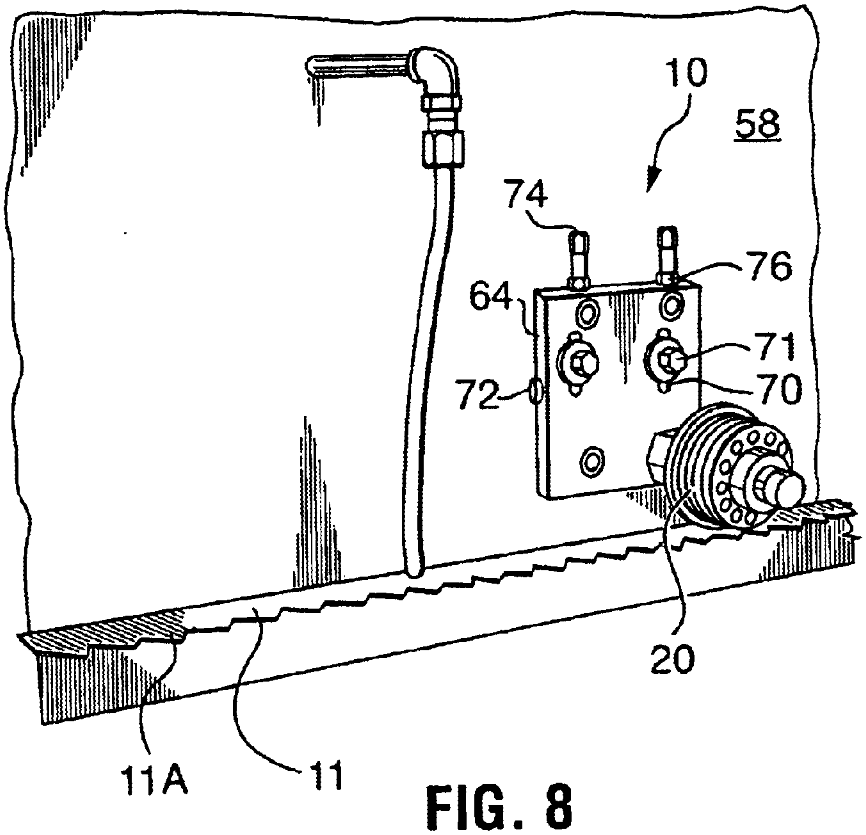
FIG. 8 is a partial perspective view of the roller guide of FIG. 7 shown attached horizontally to a mounting plate which is mounted to the saw frame utilizing a pivoting member thereinbetween to adjust the angle of roller guide and saw band blade resting thereon.
Figure 9:
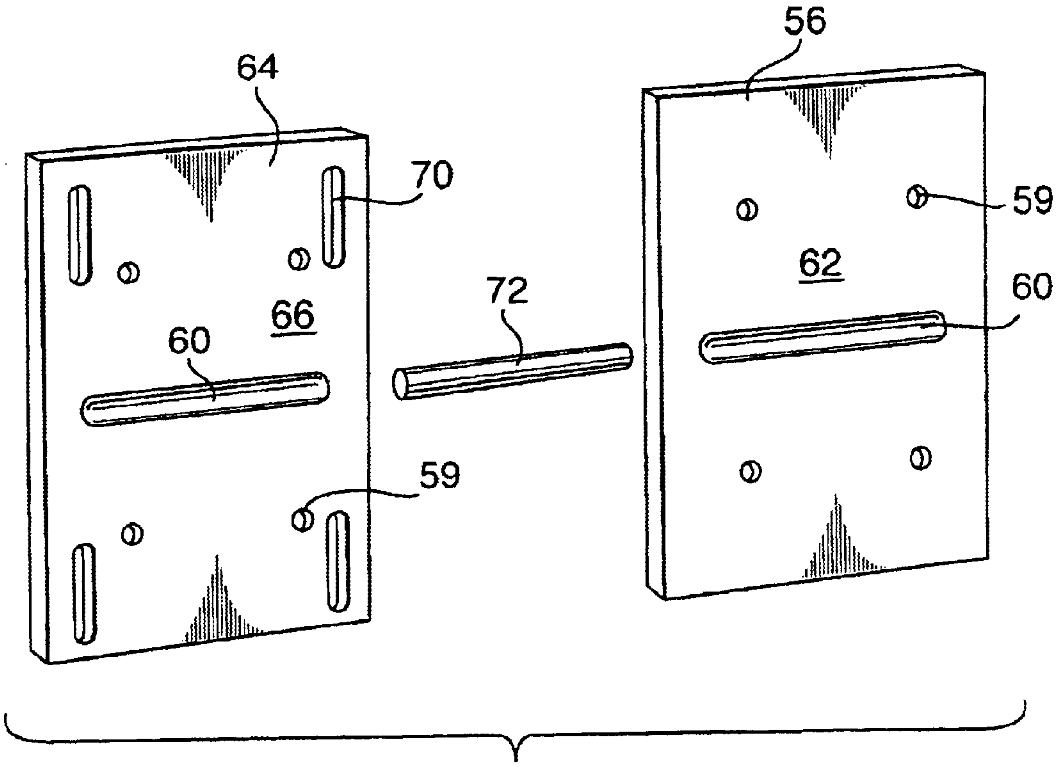
FIG. 9 is a perspective view of the mounting plate assembly showing a pair of open plates showing a groove thereinbetween for cooperative engagement with a cylindrical member disposed therein having a slightly larger diameter than the grooves in order for the plates to pivot thereabout in the vertical direction.

Of course the guide rollers can be used with the conventional arm guide or combined with the adjustable roller guide plate to provide a novel and effective means of adjusting the pitch of the saw blade. As shown in FIGS. 4 and 6, the present invention is used in combination with an adjustable arm 52 which is reciprocated by a hydraulic cylinder or preferably an air cylinder having a piston with a selected stroke in an effective range which, for the preferred embodiment of the present invention is about 10 inches.

As illustrated in FIGS. 5, 7, and 9–11, the adjustable roller guide plate 54 comprises a first inner stationary plate 56 having a plurality of holes 58 for bolting the plate 56 to the frame 58 of the saw. A shallow groove 60 is formed along the horizontal axis of the interior surface 62 thereof. A plurality of through slots 70 are formed in the stationary plate 56 for cooperative engagement with one or more bolts 71 in order to adjustably position the first stationary plate 56 and movable plate 64 in the desired position on the frame 58 of the saw.

A second outer movable plate 64 having mating holes 58 and a shallow groove 60 formed along the horizontal axis of the interior surface 66 are aligned with the holes of the first plate and bolts 68 are used to hold the plates 56 and 64, respectively, together in alignment. A cylindrical member 72 having a diameter greater than the combined depth of the shallow grooves 60 of the plates 56 and 64 is disposed thereinbetween forming a pivot point along the horizontal axis. Attachment of the roller guide 20 to the exterior surface of the outer plate 64 by means of holding such as bolts 68 extending therethrough provides a means for pivoting the roller guide 20 and changing the angle of the blade supported thereby.

At least one means of adjusting the height of the outer plate 64 formed by one or more bolts 74 having a washer or collar 76 threadably extending vertically into the movable plate 64 and abutting the top of the plate 64 or bottom of the movable plate 64 for pushing the movable plate 64 up or down with respect to the stationary plate 56.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A bandsaw blade roller guide comprising a body member having a front face and a rear face and mountable by suitable bearing means for rotation about an axis passing through said faces, said body member having an outer peripheral surface parallel to said axis for rollingly engaging a side flat face of a bandsaw blade and said body member having a flange extending outwardly from said rear face adjacent an edge thereof, said flange having a front face surface disposed perpendicular to said peripheral surface for engaging the rear edge of said bandsaw blade, said body member having a plurality of air flow passages extending there through with inlets thereto in selected one of said front and rear faces and outlets therefrom in the other one of said faces; and funneling means adjacent each one of said inlets of said body member for causing air to flow through said air flow passages during rotation of said roller guide, said funneling means comprising a louver defining an entry portion including a concave depression extending from a leading edge of said louver having a gradually decreasing slope toward a trailing edge and terminating in a rear wall adjacent said trailing edge of said entry portion.

2. The roller guide as defined in claim 1, wherein said funneling means adjacent each of said inlets are located in said rear face.

3. The bandsaw blade roller guide of claim 1, wherein said rear wall is approximately at a right angle to a surface of said rear face at its steepest central portion and merges with curved surfaces of gradually decreasing slope into said leading edge.

4. The bandsaw blade roller guide of claim 1, wherein said air passages define through bores formed in the face of the body member extending through the flange to funnel air therethrough.

5. The bandsaw blade roller guide of claim 1, wherein said air passages are angled with respect to a selected one of said front face and said rear face.

6. The bandsaw blade roller guide of claim 1, including a plurality of alternating circumferential grooves and ridges formed in said outer peripheral surface of said body member for supporting a bend blade face.

7. The bandsaw blade roller guide of claim 1, including a mounting plate assembly comprising a pair of mounting plates including a pivoting member thereinbetween to adjust the angle of said roller guide and saw band blade resting thereon.

8. The bandsaw blade roller guide of claim 7, wherein said mounting plate assembly comprises a pair of open plates having a groove thereinbetween for cooperative engagement with a cylindrical member disposed therein having a slightly larger diameter than the grooves in order for said pair of open plates to pivot thereabout.

9. A roller guide comprising a cylindrical roller body having a front portion of reduced diameter forming a collar for mounting coaxially around a shalt and a flange extending from a rear portion thereof forming a shoulder;

said cylindrical roller body having a front face and a rear face and mountable by suitable bearing means for rotation about an axis passing through said faces, said collar of said cylindrical roller body having an outer peripheral surface parallel to said axis;

said flange of said cylindrical roller body having a front face surface disposed perpendicular to said peripheral surface;

said cylindrical roller body having a plurality of air flow passages extending therethrough with inlets in a selected one of said front and rear faces and outlets therefrom in the other one of said faces; and funneling means adjacent each one of said inlets to cause air to flow through said air flow passages during rotation of the cylindrical roller body, said funneling means comprising a louver defining an entry portion including a concave depression extending from a leading edge of said louver having a gradually decreasing slope toward a trailing edge and terminating in a rear wall adjacent a trailing edge of said louver.

10. The roller guide of claim 9, wherein said rear wall is approximately at a right angle to a surface of said rear face at its steepest central portion and merging with curved surfaces of gradually decreasing slope into said trailing portion.

11. The roller guide of claim 9, wherein said inlets define air passages define through bores formed in the face of the body member extending through the flange to funnel air therethrough.

12. The roller guide of claim 9, wherein said air passages are angled with respect to a selected one of said front face and said rear face.

13. The roller guide of claim 9, including a plurality of alternating circumferential grooves and ridges formed in said outer peripheral surface of said body member for supporting a band blade face.

14. The roller guide of claim 9, including a mounting plate assembly comprising a pair of mounting plates including a pivoting member thereinbetween to adjust the angle of said roller guide.

15. The blade roller guide of claim 14, wherein said mounting plate assembly comprises a pair of open plates having a groove thereinbetween for cooperative engagement with a cylindrical member disposed therein having a slightly larger diameter than the grooves in order for said pair of open plates to pivot thereabout.

* * * * *